March 4, 1941.  C. W. HEDSTROM  2,233,866
CHILD'S VEHICLE
Filed May 19, 1939  3 Sheets-Sheet 1
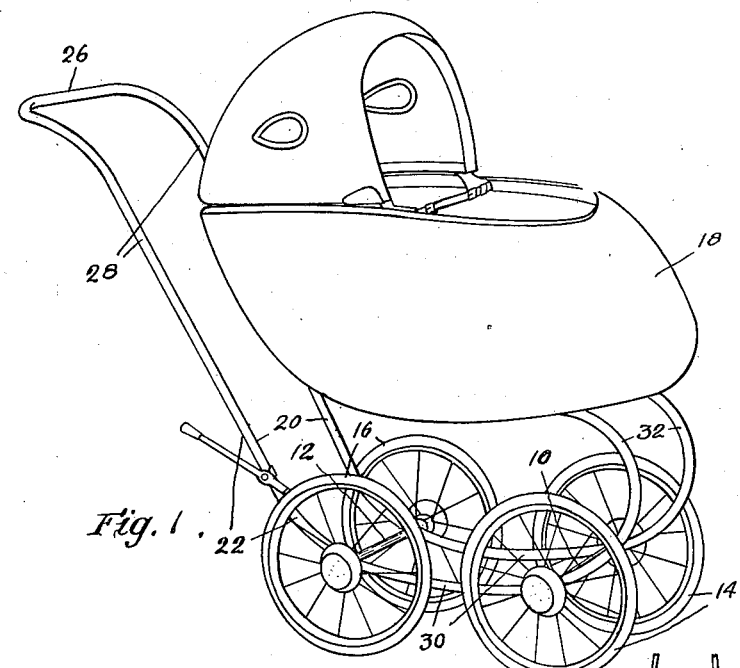
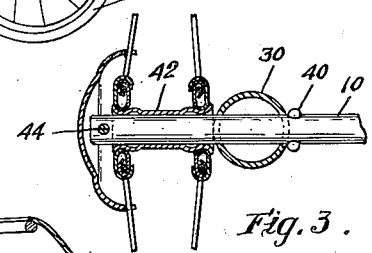
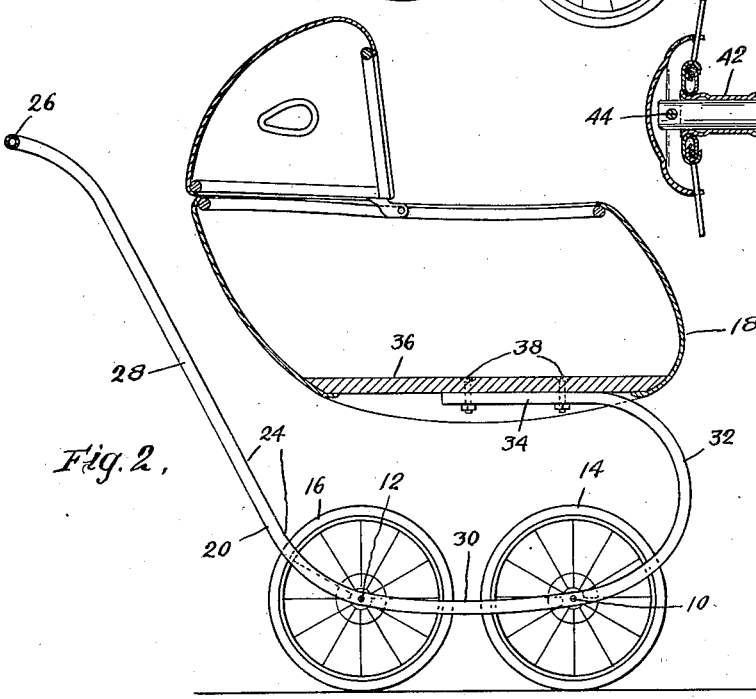

Patented Mar. 4, 1941

2,233,866

UNITED STATES PATENT OFFICE 2,233,866

CHILD'S VEHICLE

Carl W. Hedstrom, Gardner, Mass., assignor to Hedstrom-Union Company, Gardner, Mass., a corporation of Massachusetts Application May 19, 1939, Serial No. 274,611

4 Claims. (Cl. 280—47)

The present invention relates to improvements in children's vehicles, such as baby carriages, doll carriages, English coaches, strollers and the like and relates more particularly to improved running gear for such vehicles wherein the body of the vehicle is effectively resiliently supported.

Children's vehicles of the type above referred to are commonly constructed with a running gear which includes a plurality of spring members of bent flat stock connected at one end directly or indirectly to the axles of the vehicle and at their other end to the body of the vehicle. Such spring supporting means for children's vehicle bodies has been unsatisfactory since this spring construction was not sufficiently resilient to absorb the shocks imparted to the vehicle by surface obstructions or irregularities.

Where the spring strips can be made sufficiently long they can be made fairly flexible; but they cannot be placed under the carriage body. The English coach type of carriage probably has the most resiliently mounted body of any vehicle with which the present inventor is concerned but here the springs are outside the body and extend considerably above the bottom and even so the resiliency usually is enhanced by the use of flexible straps or coil springs connecting the main springs and body. Other body types are not adapted to such body suspension and outside springs furthermore are considered objectionable. Hence various designs of flat springs located under the body have been used in an attempt to get a long free length of spring stock in a confined space. Such designs are expensive by reason of the various bends that have to be utilized to get a long length of strip in a confined space, are expensive and are unsightly. Furthermore they are not successful because if they are made sufficiently resilient to have a good up and down action, they also present a fore-and-aft movement which is more objectionable than a stiff spring or even an entire absence of up and down action. In addition, a spring strip, to be sufficiently flexible for the purpose, must be thin and hence liable to crack which might cause the upsetting of the baby.

With the present invention I am able to provide a vehicle, and in fact a complete line of vehicles from the smallest doll cab to the largest baby carriage and including strollers and the like, wherein the body is resiliently supported in an excellent manner, without appreciable fore and aft movement, without tendency to tip sidewise unduly when the weight is shifted to one side of the body, without the use of fragile parts and with an entire absence of trappy parts on the moving gear and with the use of fewer parts than heretofore. Such a vehicle constitutes an object of the present invention.

A further object of the present invention, accordingly, is to improve the running gear of children's vehicles by providing a simple attractive resilient mounting for the body of the vehicle.

Most vehicles with which the present invention is concerned have pushers which comprise rods or tubes terminated in a handle and connected to the axles or the body. These pushers in the past have been separate members independent of the running gear or body. In the present invention, I make the pusher members both the resilient body supporting members and the wheel supporting members by extending them and bending them into more or less C-shape and providing thus generally parallel upper and lower parts, one of which supports the body and the other the wheels, the bend making the parts resilient so that the body has an easy up and down motion and yet has no sensible fore and aft motion. Such a construction constitutes a further object of the invention.

The body of a child's vehicle so far as I am aware heretofore has been supported by flat springs rigidly fixed to the body at both ends, where the springs are between the body and the running gear and inside the side line of the body. I have found that such a construction impairs much of what resiliency the springs may have since by being rigidly held, the ends cannot move toward and away from each other as they should do for free flexing of the bodies of the springs. Moreover the rigidly held ends act as stiff bars that cannot flex. While a rigid connection between the spring and body is desirable for strength and simplicity it inhibits free spring action.

In accordance with the present invention, I provide spring body supports at one end only of the body. These can be fixed rigidly to the body. The overhung body, being unsupported at the other end does not oppose the flexing of the springs and hence the springs can flex freely and I can use relatively large diameter tubes as the springs and obtain excellent spring action. Such a construction constitutes a further object of the invention.

As illustrated, the running gear comprises a continuous member having reflexed resilient parts, one of the reflexed parts carrying the wheels of the vehicle and the other reflexed part carrying the body of the vehicle. As illustrated, either one or the other of the reflexed parts may be integrally extended to form a pusher member for the vehicle. This running gear is preferably formed of one or two continuous metallic tubes or, in small vehicles as doll cabs, rods. When the running gear is formed of one metallic tube, the construction embodies a minimum of parts but the reflexed body carrying parts are as equally resilient in the one piece construction as they are in the two piece construction. It is apparent, therefore, that, insofar as the present invention is concerned, the running gear may be made of one or two tubular members without sacrificing resiliency of the reflexed portions.

Another object of the present invention is to provide an improved child's vehicle wherein the running gear comprises a continuous member having reflexed parts, one part carrying the wheels and the other part carrying the body of the vehicle, the wheel carrying part of the continuous member being extended integrally to form a pusher member for the vehicle.

A still further object of the invention is to provide a child's vehicle having running gear comprising a continuous member having reflexed resilient parts, one of the reflexed parts carrying the wheels, the other of the reflexed parts carrying the body of the vehicle, and the body carrying portion of the continuous member being integrally extended to form a pusher member.

Another object of the invention is generally to improve the construction and operation of children's vehicles.

With the above and other objects in view, the invention will now be described with reference to the accompanying drawings in which:

Fig. 1 is a perspective view of a child's vehicle illustrating one embodiment of the present invention;

Fig. 2 is a view in longitudinal vertical cross-section of the vehicle shown in Fig. 1;

Fig. 3 is a view in cross-section illustrating the wheel and hub construction and the method of attaching the axle to one of the resilient reflexed members;

As illustrated in Figs. 1, 2, and 3, my invention is applied to a baby carriage or doll cab comprising the front and rear axles 10 and 12 with the front and rear wheels 14 and 16 thereon, and the body 18 which can be of any desired configuration.

Figure 4:
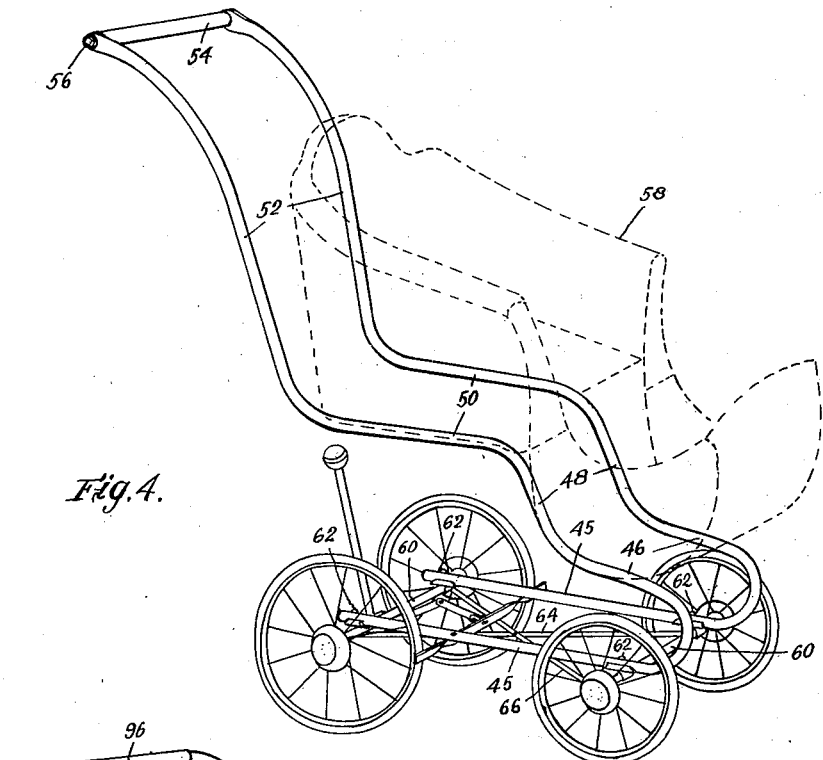
Fig. 4 is a perspective view of a modified form of the invention wherein the body of the vehicle is illustrated in dotted lines.

The running gear includes a tubular member 20 which, in accordance with the present invention, not only constitutes the means for connecting the rear axles in spaced relation but also constitutes the pusher member and the resilient support for the body. Said tubular member is herein illustrated as integral from end to end, although it can consist of two separate members, which can be connected by a handle, as illustrated in Figs. 4 et seq. Said tubular member 20 is reflexed at its middle part into approximately U-shape to include the side members 22 and 24 and the integral connecting member 26 which constitutes the handle of the pushers.

The side members are symmetrical in shape and each includes a rearwardly rising portion 28 which constitutes a pusher member, a substantially horizontal member 30 which extends across and carries and connects and spaces the axles, an upwardly bowed forepart 32 and an upper horizontal rearwardly-extended part 34 which underlies the floor board 36 of the body and is rigidly affixed thereto by suitable means as screws 38. The body thus is carried by and is fixed at its forepart to the upper sections 34 of said tube while the rear part of the body is free and unconnected with the running gear.

The tube 20 and its various parts are relatively resilient and with the construction described provides an exceptionally resilient support for the body, the body being capable, in a baby carriage, of several inches of vertical displacement. The tube 20 supporting the body is of substantial dimensions and for a baby carriage can be three fourths of an inch in diameter or thereabouts without having an exceptionally thin side wall. The tube is composed of ordinary tubular steel stock having only the intrinsic resiliency of stock of this nature. When used as described, however, it provides an exceptional amount of resiliency to the body without any noticeable fore-and-aft freedom of movement and without permitting a swaying or sidewise movement and without objectionable tilting of the body when the weight therein is on one side of the body.

The axles can be secured to the tube in any suitable manner. As illustrated in Figs. 1 and 2, and specifically in Fig. 3, the axle is passed through diametrical openings in the side wall of the member 30 of the tube and has outstanding ears 40 which prevent axial movement of the axle in one direction while the hub 42 of the wheel thereon prevents undue axial displacement of the axle in the opposite direction, the wheel being prevented from coming off the axle by suitable means as the cotter pin 44.

Both the upper and the lower sections and the intermediate bent section of the tube impart resilient support to the body as all sections are free to flex. The lower sections between the wheels are also free for flexure so that the passage of the front and rear wheels in succession over an obstruction results in less displacement of the body than if the axles were inflexibly connected together. The running gear is clean and simple in that it is free from all accessory parts such as the bent spring strip heretofore employed in vehicles of the present type.

The modification illustrated in perspective in Fig. 4 comprises a running gear formed of a pair of continuous tubular reflexed resilient members each having a substantially horizontally extending wheel carrying portion 45, an upwardly and rearwardly connecting portion 46 and a rearwardly and upwardly extending portion 48 merging into a substantially horizontal body carrying portion 50. The body carrying portion 50 is extended upwardly and rearwardly to form a pusher member 52. The upper end portion of the pusher members 52 are connected by a tubular handle member 54 through which extends a bolt 56 for clamping the upper ends of the pusher members 52 together. The body 58, in this instance being a stroller or go-cart type, may be secured to the portions 48 and 50 in any suitable manner, for example, as by screws (not shown). This construction provides a resilient mounting for the body 58 of the vehicle which is substantially as resilient as the modification shown in Figure 1. The body is provided with a two-point bearing or connection which permits the body of the vehicle to move upwardly and downwardly when the wheels of the vehicle encounter surface irregularities or obstructions. Each of the reflexed members are arranged to yield between the body and the axles, and between the axles.

The wheel carrying portions 45 are provided with axles 60 which are secured adjacent to the forward and rear end portions of the wheel carrying portions 45 in any suitable manner. As illustrated, the axles are secured to the wheel carrying portions by rivets 62 which extend vertically through holes formed in the portions 45 and through holes formed in the axles 60. The running gear is also provided with thin diagonal brace members 64 and 66 which are secured to the axles 60 by means of the bolts or rivets 62.

Figure 5:
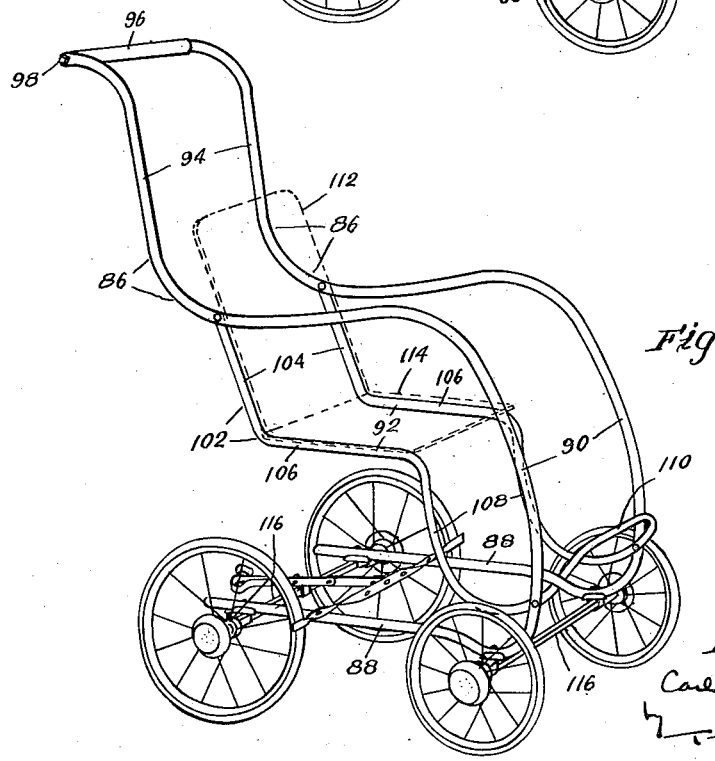
Fig. 5 illustrates a still further embodiment of the invention wherein the body of the vehicle is suspended from one of the reflexed resilient parts.

The construction shown in Fig. 5 is similar to the one disclosed in Fig. 4 in that a pair of reflexed members 86 are provided. That is to say, a two-piece running gear is provided. The reflexed tubular members 86 shown in Fig. 5 are provided with a substantially horizontal wheel carrying portion 88, upwardly curved and slightly rearwardly extending connecting portions 90 and a rearwardly and substantially horizontal body carrying or supporting portion 92. The body supporting or carrying portion 92 is extended upwardly and slightly rearwardly to form one side of a pusher member 94. At their upper ends the pusher members 94 are connected together by a tubular handle member 96 which is provided with a bolt and nut 98 for clamping the ends of the pusher members 94 together to form a unitary structure. The body supporting portion of the construction shown in Fig. 5 comprises a continuous tubular member 102 having a pair of downwardly extending portions 104 connected at their upper ends to said carrying or supporting portions 92 of the reflexed member by rivets 104. The member 102 has a pair of substantially horizontally extending parallel spaced portions 106 which form a seat support and downwardly and thence upwardly inclined portions 108 integrally connected by a substantially horizontally extending connecting portion 110, which serves as a foot rest for the child using the vehicle. The back rest 112 is secured in any suitable manner to the downwardly and forwardly extending portions 104 of the body frame 102. A seat portion 114 is secured to the said supporting portions 106 in any suitable manner, apparent to those skilled in the art. The back rest and seat members 112 and 114 are herein illustrated in dotted lines as being substantially flat and rectangular but it is evident that any other suitable back rest and seat members could be provided.

The wheel carrying portions 88, illustrated in Fig. 5 carry at their forward and rearward end portions axle members 116 which are secured thereto in any suitable manner.

Figure 6:
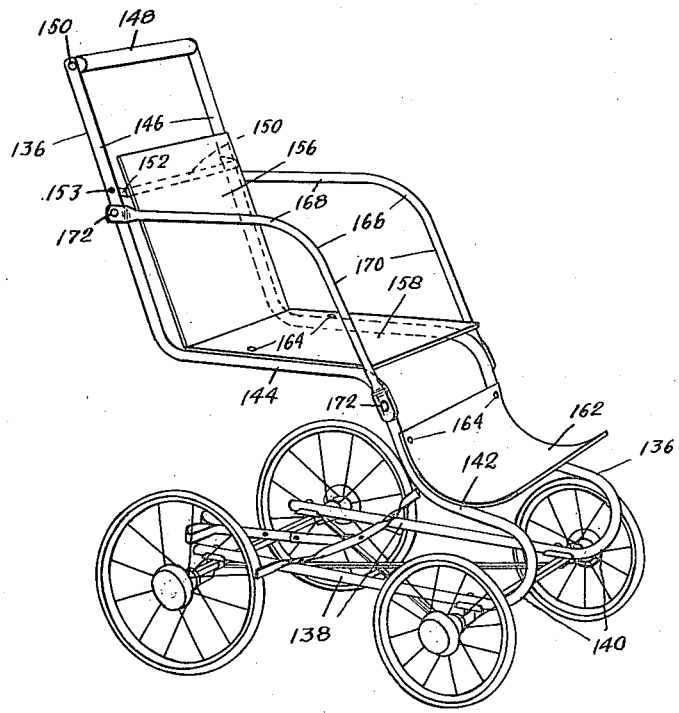
Fig. 6 is a perspective view of still another modification of the present invention.

The modification shown in Fig. 6 is provided with a pair of reflexed tubular members 136 which are formed in substantially the same manner as the tubular members disclosed in Fig. 4. Each tubular member 136 is provided with a generally horizontal wheel carrying portion 138, a forwardly and upwardly curved connecting portion 140, a rearwardly and upwardly extending connecting portion 142, a substantially horizontal body or seat supporting portion 144 and an upwardly and rearwardly extending pusher portion or member 146. The upper ends of the pusher members 146 are connected as aforesaid by a tubular handle member 148. As illustrated, the pusher members 146 are connected at about their middle portions by a strap member 150 having rearwardly extending end portions 152 which are suitably secured to the pusher members 146 by rivets 153. The strap member 150 supports the upper end of the back rest 156 of the vehicle. The lower end of the back rest or support 156 is supported on the substantially horizontal portions 144 of the reflexed tubular member 136. A seat member 158 is secured to the portions 144 by rivets 164 or by other suitable means. The upwardly and rearwardly extending connecting portions 142 have secured thereto a foot rest 162 formed of sheet metal which is secured in position by rivets or bolts 164. The vehicle is provided with a pair of arm rests 166 which may be formed of tubular metal and which are provided with a substantially horizontal portion 158 and a forwardly and downwardly extending portion 170. The upper and lower ends of the arm rests 166 are secured to the running gear 136 by any suitable means. As illustrated, the ends of the members 166 are secured to the pusher member 146 and to the upwardly and rearwardly extending connecting portions 142 by rivets 172.

In all modifications the resilient tubular members have parts carrying the axles and other parts carrying the body, one of the parts also constituting the pusher, the parts being resilient and providing for easy relative displacement toward and away from each other, and providing an overhanging body support by which exceptional resiliency is obtained. The tubular members especially in the smaller sizes of vehicles, as doll cabs can be replaced by solid rods of suitable diameter without sacrifice of resiliency.

The described construction is strong, sturdy, relatively inexpensive, and attractive in appearance.

Having thus described my invention, what I claim as new and desire to secure by Letters Patent of the United States is:

1. A child's vehicle having a body, wheels, and running gear comprising a continuous member having resilient reflexed parts, one of said reflexed parts carrying the wheels and the other of said reflexed parts carrying the body of the vehicle, a second continuous member secured to said body carrying portion for supporting the body of the vehicle, said second mentioned member having means thereon forming a foot rest for the user of the vehicle, and pusher members for said vehicle formed as integral extensions of one of said reflexed parts.

2. In a child's vehicle, a body, wheels, and a running gear comprising a pair of laterally spaced members having wheel supporting parts upwardly reflexed at the fore part of the vehicle and thence rearwardly reflexed to provide foot well parts and thence upwardly and thence rearwardly reflexed and terminated in pusher parts, and body supporting means connected to the last rearwardly reflexed parts.

3. In a child's vehicle, a body, a pair of axles, wheels thereon, and a running gear comprising resilient tubular members reflexed in the front part of the vehicle providing resiliently-connected body and axle supporting parts and intermediate foot well parts, the tubular members of one of said parts being reflexed upwardly and rearwardly of the body and terminated in pusher parts.

4. In a child's vehicle, a body, a pair of axles, wheels thereon, and a running gear comprising a pair of resilient laterally-spaced tubular members having axle-supporting parts upwardly reflexed at the forepart of the vehicle in a smooth continuous unbroken curve lying entirely above the horizontal plane including the axles and continued throughout approximately a half circle and providing a pair of upper generally horizontal rearwardly extended body supporting parts, and means connecting said body to said last mentioned parts, one of said pairs of parts being integrally continued upwardly and rearwardly of the body and terminated in pusher parts, the ends of the other pair of parts being terminated in spaced relation and being free from direct interconnection.

CARL W. HEDSTROM.